United States Patent

Svay et al.

[11] Patent Number: 4,513,296
[45] Date of Patent: Apr. 23, 1985

[54] HEAT-SENSITIVE RECORDING HEAD

[75] Inventors: Leng Svay; Haruhiko Moriguchi; Toshiharu Inui, all of Kanagawa, Japan

[73] Assignee: Fuji Xerox Co., Ltd., Japan

[21] Appl. No.: 464,173

[22] Filed: Feb. 7, 1983

[30] Foreign Application Priority Data

Feb. 6, 1982 [JP] Japan ................... 57-16975

[51] Int. Cl.$^3$ ............................. G01D 15/10
[52] U.S. Cl. .................. 346/76 PH; 346/139 C; 219/216; 400/120
[58] Field of Search ........... 346/76 PH, 139 C; 219/216 PH; 400/120

[56] References Cited

U.S. PATENT DOCUMENTS

| | | | |
|---|---|---|---|
| 3,984,844 | 10/1976 | Tanno | 219/216 PH |
| 4,074,109 | 2/1978 | Baraff | 346/76 PH |
| 4,074,280 | 2/1978 | Kojima | 346/76 PH |
| 4,251,822 | 2/1981 | Hara | 346/76 PH |
| 4,298,786 | 11/1981 | Marciniec | 346/76 PH |

Primary Examiner—E. A. Goldberg
Assistant Examiner—M. Reinhart
Attorney, Agent, or Firm—Sughrue, Mion, Zinn, Macpeak and Seas

[57] ABSTRACT

A heat-sensitive recording head, comprising:
  two heat generating resistors which are obtained by dividing a conventional heat generating resistor, the resistors being arranged substantially in parallel with each other on a substrate; and
  first and second groups of lead electrodes which are coupled to the two heat generating resistors, respectively, in such a manner that the first and second groups of lead electrodes are shifted by half a pitch from each other.

6 Claims, 5 Drawing Figures

HEAT-SENSITIVE RECORDING HEAD

BACKGROUND OF THE INVENTION

1. Field of the Invention

This invention relates to thermal heads for thermally recording data, more particularly to a heat-sensitive recording head which can record oblique line or curved lines with high quality.

2. Description of the Prior Art

In general, a conventional heat-sensitive recording head, as shown in FIG. 1, comprises a number of heat generating elements 1 which are arranged in a line along the main scanning direction of a recording sheet. In FIG. 1, reference numeral 2 designates a lead electrode.

The heat generating elements are selectively applied with current according to video data so as to generate heat, as a result of which the corresponding heat-sensitive recording medium is heated, and the data are recorded on the recording sheet.

However, the above-described conventional heat-sensitive recording head is disadvantageous in that when an oblique line or curved line is recorded with the recording head, the resulting recorded dots 3 are not smoothly merged with one another as shown in FIG. 2.

SUMMARY OF THE INVENTION

Accordingly, one object of the present invention is to provide a heat-sensitive recording head in which the above-described drawback accompanying conventional heat-sensitive recording heads has been eliminated, whereby oblique lines or curved lines can be recorded with high quality.

The foregoing object and other objects of the invention have been achieved by the provision of a heat-sensitive recording head which comprises two heat generating resistors which are obtained by dividing a conventional heat generating resistor, the resistors being arranged substantially in parallel with each other on a substrate, with first and second groups of lead electrodes being coupled to the two heat generating resistors, respectively, in such a manner that the first and second groups of lead electrodes are shifted by half a pitch from each other.

DESCRIPTION OF PREFERRED EMBODIMENTS

Figure 1:
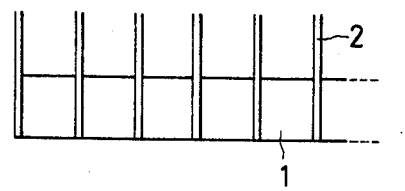
FIG. 1 is a plan view illustrating the heat generating elements of a conventional heat-sensitive recording head.
Figure 2:
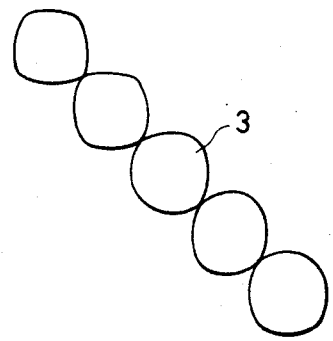
FIG. 2 is an explanatory diagram showing an oblique line recorded with the conventional heat-sensitive recording head.
Figure 3:
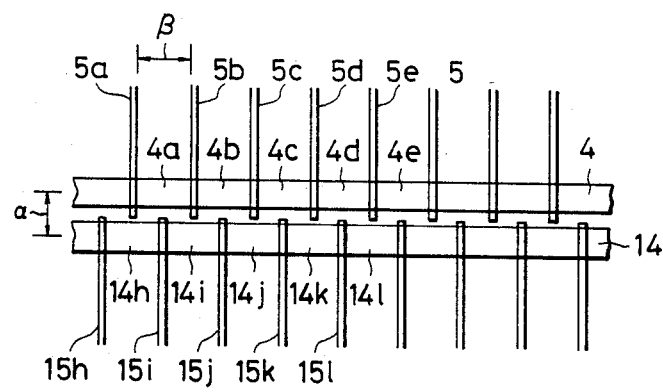
FIG. 3 is a plan view illustrating one example of a heat-sensitive recording head according to this invention.

FIG. 3 is a plan view outlining one example of a heat-sensitive recording head according to this invention.

In FIG. 3, reference numerals 4 and 14 designate heat generating resistors which are substantially in parallel with each other and reference characters 4a, 4b, 4c, . . . and 14h, 14i, 14j, . . . designate the heat generating elements of the heat generating resistors 4 and 14, which are defined by the lead electrodes 5a, 5b, 5c, . . . and 15h, 15i, 15j, . . . of the heat generating resistors 4 and 14, respectively.

The sum of the widths of the two heat generating resistors is equal to the width of the conventional heat generating resistor. The distance $\alpha$ between the center lines of the two heat generating resistors 4 and 14 is about a half of the distance $\beta$ between two adjacent lead electrodes.

Recording is carried using a heat-sensitive recording head thus constructed as follows. For instance, when it is necessary to cause heat generating element 4a to generate heat, current is applied to lead electrodes 5a and 5b, and when it is necessary to cause heat generating element 4b to generate heat, current is applied to the lead electrodes 5c and 5b.

On the other hand, when it is necessary to cause heat generating element 14h to generate heat, current is applied to the lead electrodes 15h and 15i, and when it is necessary to cause the heat generating element 14i to generate heat, lead electrodes 15j and 15i are energized. As will be apparent to one skilled in the art, other heat generating elements are energized in a similar fashion.

Figure 4:
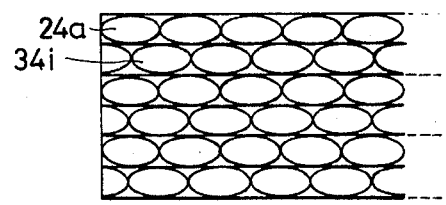
FIG. 4 is an explanatory diagram showing the arrangement of dots recorded by the recording head in FIG. 3.

FIG. 4 is an explanatory diagram showing the arrangement of dots recorded using the heat-sensitive recording head shown in FIG. 3. Since the sum of the widths of the two heat generating resistors 4 and 14 is substantially equal to the width of a conventional heat generating resistor as described above, the sum of the areas of two dots 24a and 34i recorded by the heat generating elements 4a and 14i, for instance, is substantially equal to the area of one conventional recorded dot.

Figure 5:
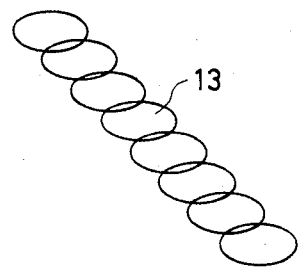
FIG. 5 is an explanatory diagram showing an oblique line recorded with the heat-sensitive recording head in FIG. 3.

In experiments performed by the present inventors, the above-described recording operation was carried out with a heat-sensitive recording head which had heat generating resistors made of ruthenium oxide on a ceramic substrate and lead electrodes, namely, gold electrodes, connected to the heat generating resistors. As a result, an image of excellent quality, in which dots 13 were connected to one another relatively smoothly or stepless, as shown in FIG. 5, was recorded.

In the experiments, the distance between the center lines of the heat generating resistors (made of ruthenium oxide) shown as $\alpha$ in FIG. 3 was 62 μm, and the distance between two adjacent lead electrodes shown as $\beta$ in FIG. 3 was 125 μm.

As is apparent from the above description, the area of a dot recorded using a conventional recording head corresponds to the sum of the areas of two dots recorded by the recording head according to the present invention, and, therefore, the density of recorded dots can be increased according to the principle of halftone printing. Accordingly, the differences in density between gradations can be increased, whereby halftones can be recorded more precisely. This is an additional effect of the invention.

As is clear from the above description, in the heat-sensitive recording head of the invention, two heat generating resistors which are obtained by dividing a heat generating resistor adapted to record a scanning line are arranged substantially in parallel, and lead electrodes are coupled to the heat generating resistors in such a manner that the lead electrodes coupled to one of the heat generating resistors are shifted by half (½) a pitch from those coupled to the other heat generating resistor. Accordingly, oblique lines or curved lines recorded with the heat-sensitive recording head according to the invention are excellent in quality. Furthermore, characters can be recorded round at the corners.

What is claimed is:

1. A heat-sensitive recording head, comprising:
   two heat generating resistors which are obtained by dividing a conventional heat generating resistor;
   the resistors being arranged substantially in parallel with each other on a substrate; and
   first and second groups of lead electrodes which are coupled to the two heat generating resistors, respectively, in such a manner that the first and second groups of lead electrodes are shifted by half a pitch from each other;
   wherein the distance between the center lines of the two heat generating resistors is about half of the distance between two adjacent lead electrodes.

2. A heat-sensitive recording head as claimed in claim 1, wherein said heat generating resistors comprise ruthenium oxide on a ceramic substrate.

3. A heat-sensitive recording head as claimed in claim 2, wherein said lead electrodes are gold electrodes.

4. A method of thermally recording, comprising:
   recording with a heat-sensitive recording head, comprising:
   two heat generating resistors which are obtained by dividing a conventional heat generating resistor;
   the resistors being arranged substantially parallel with each other on a substrate; and
   first and second groups of electrodes which are coupled to the two heat generating resistors, respectively, in such a manner that the first and second groups of lead electrodes are shifted by half a pitch from each other;
   wherein the distance between the center lines of the two heat generating resistors is about half of the distance between two adjacent electrodes.

5. A method of thermally recording as disclosed in claim 4, wherein said heat generating resistors comprise ruthenium oxide on a ceramic substrate.

6. A method of thermally recording as disclosed in claim 5, wherein said lead electrodes are gold electrodes.

* * * * *